United States Patent
Conus et al.

(10) Patent No.: US 9,457,536 B2
(45) Date of Patent: Oct. 4, 2016

(54) ASSEMBLY OF A PART THAT HAS NO PLASTIC DOMAIN

(75) Inventors: Thierry Conus, Lengnau (CH); Marco Verardo, Les Bois (CH); Igor Saglini, Fenin (CH); Frederic Kohler, Villars-sur-Glane (CH)

(73) Assignee: ETA SA MANUFACTURE HORLOGERE SUISSE, Grenchen (CH)

( * ) Notice: Subject to any disclaimer, the term of this patent is extended or adjusted under 35 U.S.C. 154(b) by 471 days.

(21) Appl. No.: 13/995,328

(22) PCT Filed: Nov. 22, 2011

(86) PCT No.: PCT/EP2011/070689
§ 371 (c)(1),
(2), (4) Date: Aug. 12, 2013

(87) PCT Pub. No.: WO2012/084383
PCT Pub. Date: Jun. 28, 2012

(65) Prior Publication Data
US 2013/0309446 A1 Nov. 21, 2013

(30) Foreign Application Priority Data

Dec. 22, 2010 (EP) ..................................... 10196591

(51) Int. Cl.
*B32B 3/26* (2006.01)
*G04B 13/02* (2006.01)
*G04B 15/14* (2006.01)
*G04B 17/32* (2006.01)
*G04B 17/34* (2006.01)
(Continued)

(52) U.S. Cl.
CPC ............. *B32B 3/266* (2013.01); *G04B 13/022* (2013.01); *G04B 13/026* (2013.01); *G04B 15/14* (2013.01); *G04B 17/325* (2013.01);
(Continued)

(58) Field of Classification Search
CPC .. B23B 3/266; G04B 13/022; G04B 13/026; G04B 17/325; G04B 17/345; G04D 1/0042; G04D 3/04; Y10T 29/49826; Y10T 428/24306; Y10T 428/24322; Y10T 428/24298
See application file for complete search history.

(56) References Cited

U.S. PATENT DOCUMENTS 8,206,029 B2 * 6/2012 Vaucher ............... G04B 13/022
29/893.2
2012/0090933 A1 4/2012 Conus et al.

FOREIGN PATENT DOCUMENTS

CH WO 2007099068 A1 * 9/2007 ........... G04B 13/022
CH 700 260 7/2010
(Continued)

OTHER PUBLICATIONS

International Search Report Issued Jun. 5, 2012 in PCT/EP11/70689 filed Nov. 22, 2011.

*Primary Examiner* — Moshe Wilensky
(74) *Attorney, Agent, or Firm* — Oblon, McClelland, Maier & Neustadt, L.L.P.

(57) ABSTRACT

An assembly of a member, made of a first material in an aperture of a part, made of a second material having no plastic domain, using an intermediate part made of a third material, mounted between the member and the part. The intermediate part includes a hole for receiving the member. The part includes pierced holes forming a deformation mechanism distributed around the aperture thereof. The elastically and plastically deformed intermediate part radially grips the member and stresses the elastic deformation mechanism of the part so as to secure the assembly in a manner that is not destructive for the part. Such an assembly can for example be used in the field of timepieces.

20 Claims, 5 Drawing Sheets

(51) Int. Cl.
*G04D 1/00* (2006.01)
*G04D 3/04* (2006.01)

(52) U.S. Cl.
CPC ......... *G04B 17/345* (2013.01); *G04D 1/0042* (2013.01); *G04D 3/04* (2013.01); *Y10T 29/49826* (2015.01); *Y10T 428/24298* (2015.01); *Y10T 428/24306* (2015.01); *Y10T 428/24322* (2015.01)

(56) References Cited

FOREIGN PATENT DOCUMENTS

| | | | |
|---|---|---|---|
| CH | 700260 A2 * | 7/2010 | ........... G04B 17/063 |
| EP | 1 850 193 | 10/2007 | |
| EP | 2 075 652 | 7/2009 | |
| EP | 2 442 189 | 4/2012 | |

\* cited by examiner

ASSEMBLY OF A PART THAT HAS NO PLASTIC DOMAIN

CROSS-REFERENCE TO RELATED APPLICATIONS

This is a National Phase Application in the United States of International Patent Application PCT/EP2011/070689 filed Nov. 22, 2011, which claims priority on European Patent Application No. 10196591.1 of Dec. 22, 2010. The entire disclosures of the above patent applications are hereby incorporated by reference.

FIELD OF THE INVENTION

The invention relates to the assembly of a part, made of a material having no plastic domain, to a member comprising a different type of material.

BACKGROUND OF THE INVENTION

Current assemblies including a silicon-based part are generally secured by bonding. This type of operation requires extremely delicate application which makes it expensive.

EP Patent No. 1 850193 discloses a first, silicon-based part which is assembled on a metal arbour using an intermediate metallic part. However, the shape variants proposed in this document are not satisfactory and either cause the silicon part to break during the assembly thereof, or do not bind the parts sufficiently well to each other.

SUMMARY OF THE INVENTION

It is an object of the present invention to overcome all or part of the aforecited drawbacks by providing an adhesive-free assembly which can secure a part made of a material with no plastic domain to a member comprising a ductile material, such as, for example, a metal or metal alloy.

The invention therefore relates to an assembly of a member made of a first material, in an aperture of a part made of a second material having no plastic domain, using an intermediate part made of a third material, which is mounted between said member and said part, characterized in that the intermediate part has a hole for receiving said member, in that the part includes pierced holes forming elastic deformation means distributed around the aperture and in that the elastically and plastically deformed intermediate part radially grips said member and stresses the elastic deformation means of the part in order to secure the assembly in a manner that is not destructive for said part.

This configuration advantageously enables the unit comprising the part—intermediate part—member to be secured without bonding to an ordinary, precision controlled member, while ensuring that the part is not subject to destructive stresses, even if is formed, for example, from silicon.

In accordance with other advantageous features of the invention:

The shape of the external wall of the intermediate part substantially matches the aperture in the part so as to exert a substantially uniform radial stress on the wall of the part surrounding said aperture;
The aperture in the part is circular;
The aperture in the part is asymmetrical to prevent any relative movements between the elements of said assembly;
The pierced holes are formed at a distance from and around the aperture by two series of diamond-shaped holes distributed in a quincunx arrangement so as to form beams arranged in secant V-shapes;
The pierced holes include, between the first two series and the aperture, a third series which is formed of triangular holes and arranged in a quincunx arrangement with one of the first two series so as to form beams distributed in secant X-shapes;
The part includes slots allowing communication between the third series of holes and the aperture;
The pierced holes are formed at a distance from and around the aperture by a first series of oblong holes distributed in a quincunx arrangement with a second series of triangular holes, wherein the second series is the closest to the aperture, and each triangular hole communicates with the aperture via a notch so as to form beams that are radially moveable according to the thickness of the oblong holes;
The pierced holes include a third series of holes in a triangle, each hole of the third series being distributed between two triangular holes of the second series and communicating with the aperture via a slot, so as to form beams with two independent arms that are moveable radially according to the thickness of the oblong holes and tangentially according to the thickness of the slots;
The series of holes extend over a width comprised between 100 μm and 500 μm from the edge of the aperture;
The aperture has a section of between 0.5 and 2 mm.

Moreover, the invention relates to a timepiece, characterized in that it includes an assembly according to any of the preceding variants.

Finally, the invention relates to a method of assembling a member, made of a first material, in a part made of a second material having no plastic domain. The method includes the following steps:

a) Forming the part with an aperture and pierced holes distributed around the aperture intended to form elastic deformation means;
b) Inserting an intermediate part made of a third material into the aperture without any stress;
c) Introducing said member into the hole without any stress;
d) Elastically and plastically deforming the intermediate part by moving together two tools towards each other axially above and below said intermediate part so as to exert a radial stress against the member and against the wall of the part surrounding said aperture, using said elastic deformation means of the part to secure the assembly in a manner that is not destructive for said part.

This method advantageously allows the member to be radially secured without any axial stress being applied to the part. Indeed, advantageously according to the invention, only radial, elastic deformation is applied to the part. Finally, this method unites the assembly comprising the part—intermediate part—member by adapting to the dispersions in manufacture of the various components.

In accordance with other advantageous features of the invention:

The shape of the external wall of the intermediate part substantially matches the aperture in the part so as to exert a substantially radial stress on the wall of the part surrounding the aperture;
The aperture in the part is circular;

The aperture in the part is asymmetrical to prevent any relative movements between the elements of said assembly;

In step b), the difference between the section of the aperture and the external section of the intermediate part is around 10 μm;

In step c), the difference between the section of the member and the internal section of the intermediate part is around 10 μm;

In step d), the deformation exerts a clamping force that generates a displacement of between 16 and 40 μm;

In steps b) to d), the intermediate part is held in the aperture by using one of the two tools;

The second material is silicon-based;

The third material is formed from a metal or metal alloy base;

The part may be, for example, a timepiece wheel set, timepiece pallets, a timepiece balance spring, a resonator or even a MEMS.

BRIEF DESCRIPTION OF THE DRAWINGS

Other features and advantages will appear clearly from the following description, given by way of non-limiting indication, with reference to the annexed drawings, in which.

DETAILED DESCRIPTION OF PREFERRED EMBODIMENTS

Figure 1:
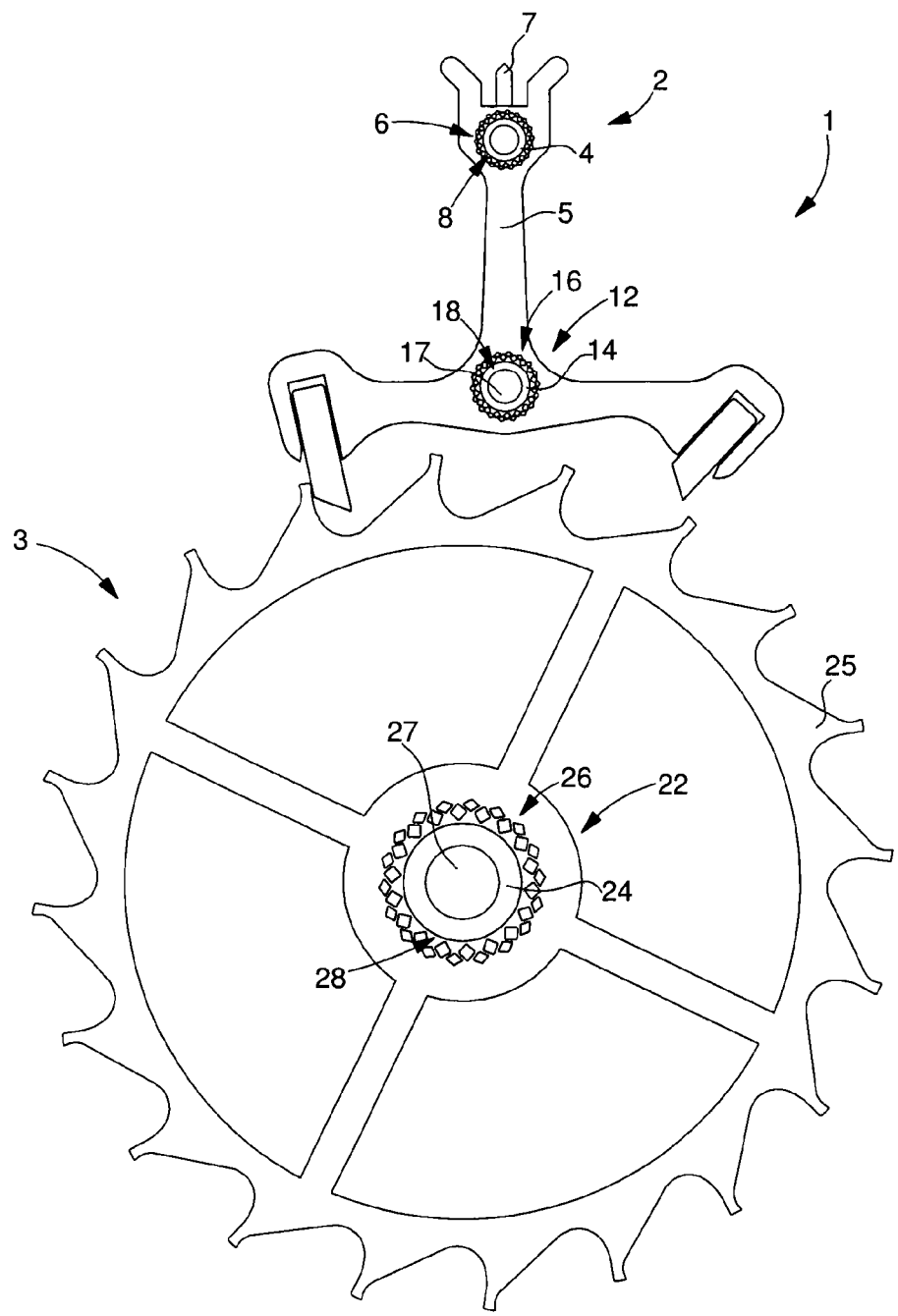
FIG. 1 is a partial, schematic view of a timepiece movement including three assemblies according to the invention.

As explained above, the invention relates to an assembly and the method of assembling the same, for uniting a fragile material, i.e. which has no plastic domain such as a silicon-based material, with a ductile material such as a metal or metal alloy.

This assembly was devised for applications within the field of horology. However, other domains may very well be envisaged, such as, notably aeronautics, jewelry, the automobile industry or tableware.

In the field of horology, this assembly is required due to the increasing importance of fragile materials, such as those based on silicon, quartz, corundum or more generally ceramics. By way of example, it is possible to envisage forming the balance spring, balance, pallets, bridges or even the wheel sets, such as the escape wheels, completely or partially from a base of fragile materials.

However, the constraint of always having to use ordinary steel arbours, the fabrication of which has been mastered, is difficult to reconcile with the use of parts having no plastic domain. Indeed, when tests were carried out, it was impossible to drive in a steel arbour and this systematically broke fragile parts, i.e. those with no plastic domain. For example, it became clear that the shearing generated by the entry of the metallic arbour into the aperture in a silicon part systematically breaks the part.

This is why the invention relates to an assembly of a member made of a first material, for example a ductile material such as steel, in the aperture in a part made of a second material having no plastic domain, such as a silicon-based material, by the deformation of an intermediate part, made of a third material, which is mounted between said member and said part.

According to the invention, the intermediate part includes a hole for receiving said member. Moreover, the elastically and plastically deformed intermediate part radially grips said member and stresses the elastic deformation means of the part to secure the assembly in a manner that is not destructive for said part.

Moreover, in a preferred manner, the shape of the external wall of the intermediate part substantially matches the aperture of the part, so as to exert a substantially uniform radial stress on the wall of the part surrounding said aperture. Indeed, when research was carried out, it was clear that the intermediate part distributed the radial stresses induced by its deformation in a uniform manner over a maximised surface area of the wall of the part surrounding the aperture.

Consequently, if the aperture in the fragile part is circular, it is preferable for the external wall of the intermediate part to be substantially shaped like a continuous cylinder, i.e. with no radial slot or axial pierced hole, to prevent any localised stresses on a weak portion of the wall of the part surrounding the aperture, which could break the fragile material.

Of course, the shape of the aperture in the fragile part may differ, for example by being asymmetrical, to prevent any relative movements between the elements of the assembly. This asymmetrical aperture may therefore be, for example, substantially elliptical.

This interpretation also justifies not using a collar on the top or bottom portion of the intermediate part. Indeed, during the deformation, this type of collar transmits part of the axial deformation force from the member onto the top (or the bottom) of the fragile part. Hence, the shearing exerted, in particular, by the edges of the collar on the top (or bottom) of the fragile part similarly generates localised stresses that can break the fragile part.

Consequently, if the section of the aperture is circular, the intermediate part (the shape of which matches the aperture) which has a hole may be interpreted as an unbroken ring with continuous internal and external walls, i.e. without any grooves or more generally any discontinuity of material. Thus, via elastic and plastic deformation, the matching shape of the intermediate part enables a substantially uniform radial stress to be generated over a maximised surface area of the wall of the part around the aperture.

Of course, this matching wall shape also applies to the internal wall of the intermediate part facing the member. It is therefore clear that the shape of the internal wall could match the external shape of the member in order to generate a substantially uniform radial stress of the internal wall of the intermediate part on a maximised surface area of the external wall of the member.

Finally, according to the invention, the part includes pierced holes forming elastic deformation means, which is distributed around and at a distance from the aperture and which is intended to absorb said radial forces and to return them once the stress from the tools has been relaxed so as, eventually, to secure the assembly in a manner that is not destructive for said part.

Figure 2:
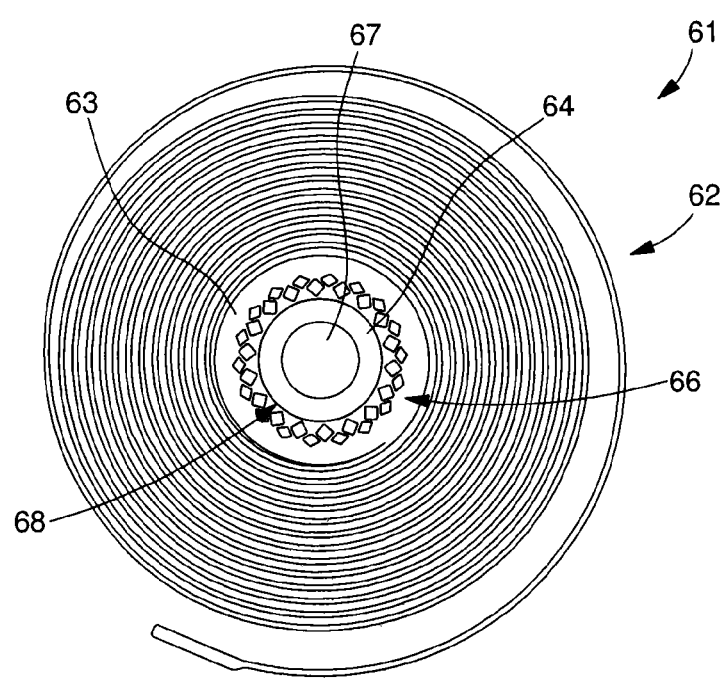
FIG. 2 is a partial, schematic view of a timepiece balance spring including a fourth assembly according to the invention.

The assembly according to the invention will be better understood with reference to FIGS. 1 to 8 showing example applications within the field of horology. FIG. 1 shows a timepiece escape system, including pallets 1 and an escape wheel 3 and FIG. 2 shows a balance spring 61.

In the case of FIG. 1, the pallets 1 for example include two assemblies 2, 12 according to the invention, respectively for securing the dart 7 and the member, which here is a pivot pin 17, with the lever 5 thereof. As seen in FIG. 1, each assembly 2, 12 includes an intermediate part 4, 14, in the form of a solid ring, cooperating between dart 7 or member 17 and lever 5 of pallets 1. Moreover, each assembly 2, 12 includes pierced holes 6, 16 made in lever 5 around an aperture 8, 18 and which are intended to form elastic deformation means. It is thus clear that assembly 2, 12 is sufficiently resistant to avoid generating relative movements between its components.

The escape wheel 3, and more generally wheel set 3, includes, by way of example, an assembly 22 for securing the member, which here is pivot pin 27, to body 25 of wheel 3. As seen in FIG. 1, assembly 22 includes an intermediate part 24 in the form of a solid ring cooperating between member 27 and body 25 of wheel 3. Moreover, assembly 22 includes pierced holes 26, which are made in the hub around an aperture 28 in wheel 3 and intended to form elastic deformation means.

It is thus immediately clear that the example assembly 22 can be applied to any type of wheel set. Further, member 27 may comprise an integral pinion so as to form the finished wheel set.

Thus, as illustrated in FIG. 2, it is possible to fix a balance spring 61 to a member, which here is a balance staff 67, by using an assembly 62 according to the invention. Pierced holes 66 are formed in collet 63 of balance spring 61 and an intermediate part 64 is mounted in the aperture 68 in of collet 63 in a similar manner to the above explanations.

Examples of pierced holes are shown in FIGS. 3 to 8. According to a first embodiment illustrated in FIGS. 3 to 6, the pierced holes are formed at a distance from and around the aperture by two series of diamond-shaped holes distributed in a quincunx arrangement so as to form beams arranged in secant V-shapes.

Figure 3:
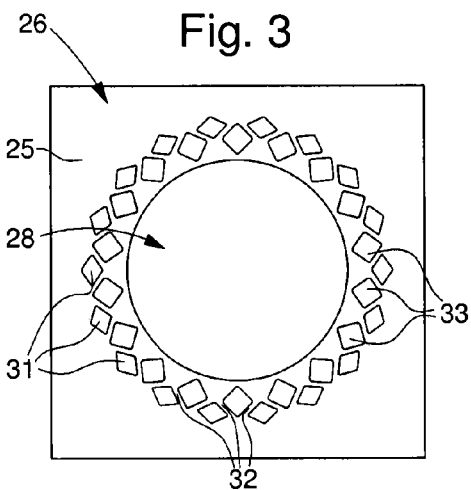
FIGS. 3 to 6 are views of variants of a first embodiment of elastic deformation means according to the invention.

FIG. 3 is a diagram of pierced holes 6, 16, 26, 66 of FIGS. 1 and 2. For more simplicity, only the wheel 3 references are used again in FIG. 3. FIG. 3 shows pierced holes 26, which preferably pass through the entire thickness of body 25, made of fragile material. Pierced holes 26 are distributed at a distance from and around aperture 28 which is also preferably formed to pass through the entire thickness of body 25 made of fragile material.

As seen in FIG. 3, pierced holes 26 form a first series of holes 31, the farthest from aperture 28, and a second series of holes 33, which are diamond-shaped and in a quincunx arrangement. FIG. 3 shows that pierced holes 31, 33 thus form V-shaped beams 32 which are secant to each other.

Figure 4:
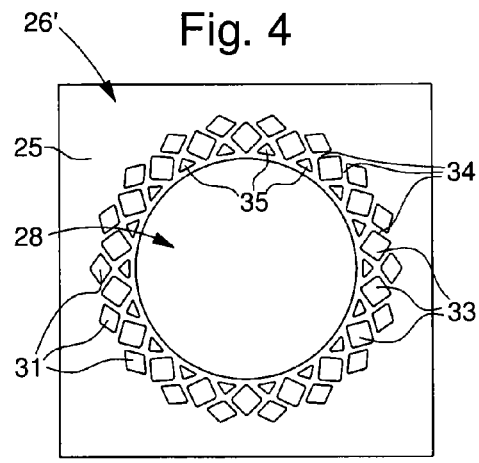

In a first variant of the first embodiment illustrated in FIG. 4, pierced holes 26' again comprise the first and second series of holes 31, 33 with the addition of a third series, which, formed of triangular holes 35, is located between the first two series and aperture 28, i.e. it is the closest to aperture 28. As seen in FIG. 4, the third series of holes 35 is distributed in a quincunx arrangement with one 33 of the first two series, so as to form X-shaped secant beams 34.

Figure 5:
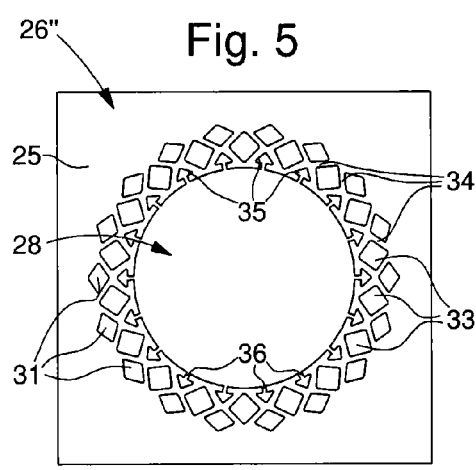

In a second variant of the first embodiment illustrated in FIG. 5, the pierced holes 26" again comprise the pierced holes 26' of FIG. 4 with the addition of slots 36 via which the third series of holes 35 communicate with aperture 28.

Advantageously, according to the invention, the series of holes 31, 33 and 35 and slots 36 are used to form elastic deformation means capable of absorbing radial stresses, i.e. forces exerted from the centre of aperture 28 towards the wall of body 25 surrounding said circular aperture.

Of course, the two or three series may be closer to or further from each other and/or of different shapes and/or different dimensions according to the maximum desired clearance and the desired stress for deforming beams 32, 34.

Figure 6:
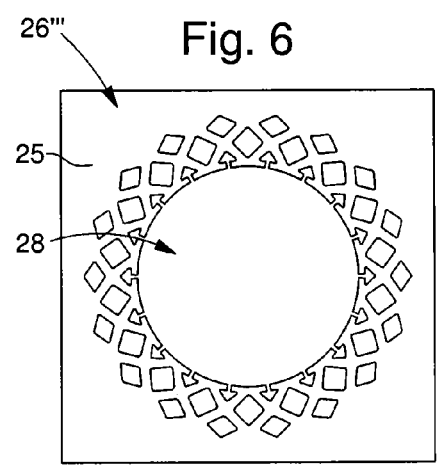

By way of example, an alternative to FIG. 5 is shown in FIG. 6. It can be seen that pierced holes 26''' are similar to those 26" of FIG. 5. However, the three series of holes are spaced further apart from each other. Further, it can be seen that the shapes and dimensions of both the holes and slots are different. It is thus clear that the alternative of FIG. 6 alters the rigidity of the elastic deformation means in the fragile material.

Preferably, pierced holes 26, 26', 26", 26''' extend over a width comprised between 100 μm and 500 μm from the wall of body 25 surrounding aperture 28. Further, slots 36 are comprised between 15 μm and 40 μm. Finally, the section of aperture 28 is preferably comprised between 0.5 and 2 mm.

Figure 7:
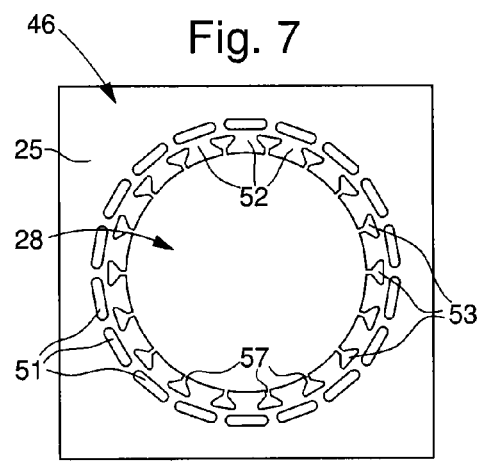
FIGS. 7 and 8 are views of variants of a second embodiment of elastic deformation means according to the invention.
Figure 8:
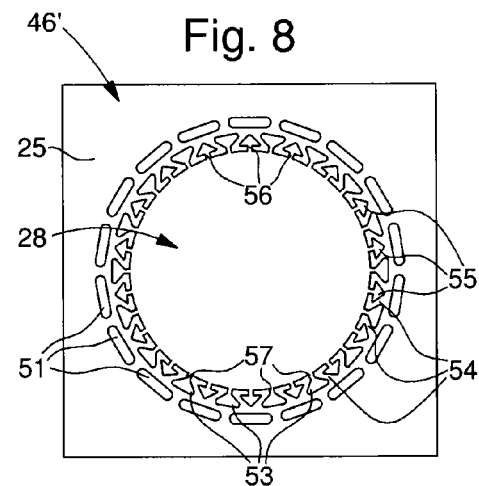

According to a second embodiment illustrated in FIGS. 7 and 8, the pierced holes are formed at a distance from and around the aperture by a first series of oblong holes distributed in a quincunx arrangement with a second series of triangular holes, the second series being closest to the circular aperture, each triangular hole communicating with the aperture via a notch so as to form beams that are radially moveable according to the thickness of the oblong holes.

Thus, FIG. 7 shows pierced holes 46 which preferably pass through the entire thickness of body 25, made of fragile material. Pierced holes 46 are distributed at a distance from and around aperture 28 which is also preferably formed to pass through the entire thickness of body 25 made of fragile material.

As seen in FIG. 7, pierced holes 46 form a first series of oblong holes 51 and a second series of triangular holes 53. According to the second embodiment, the two series of holes 51, 53 are arranged in a quincunx arrangement.

Further, each triangular hole 53 communicates with aperture 28 via a notch 57. FIG. 7 shows that pierced holes 46 thus form substantially trapezium shaped beams 52 which are separated from each other by notches 57. It is also noted that each beam 52 is centred on an oblong hole 51, which makes each beam 52 radially moveable according to the thickness of an oblong hole 51.

In a variant of the second embodiment illustrated in FIG. 8, pierced holes 46' again comprise the pierced holes 46 of FIG. 7, with the addition of a third series of triangular holes 55. Further, each hole 55 of the third series is arranged between two triangular holes 53 of the second series and communicates with aperture 28 via a slot 56. The pierced holes 46' thus form beams 54 with two independent symmetrical and substantially L-shaped arms, which are radially moveable according to the thickness of oblong holes 51 and tangentially according to the thickness of slots 56 and notches 57.

Of course, as in the first embodiment, the two or three series may be closer to or further from each other and/or of different shapes and/or of different dimensions according to the maximum desired clearance and the desired stress for deforming beams 52, 54.

Preferably, pierced holes 46, 46' extend over a width comprised between 100 μm and 500 μm from the wall of body 25 surrounding aperture 28. Further, slots 56 and notches 57 are comprised between 15 μm and 40 μm. Finally, the section of aperture 28 is preferably comprised between 0.5 and 2 mm.

Figure 9:
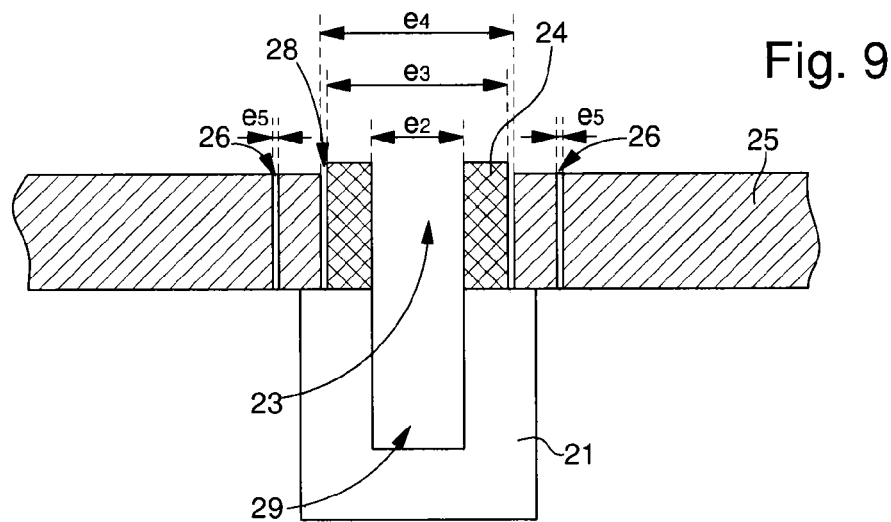
FIGS. 9 to 11 are schematic diagrams of successive steps of the assembly method according to the invention.

The method of assembly will now be explained with reference to the schematic FIGS. 9 to 11. For more simplicity, only the wheel 3 references are used again in FIGS. 9 to 11. According to the invention, a first step consists in forming part 3 from a material having no plastic domain, with an aperture 28 and pierced holes 26, which are distributed around aperture 28 and intended to form elastic deformation means, in accordance, for example, with the embodiments explained hereinbefore. As seen in FIG. 9, aperture 28 has a section $e_4$ and pierced holes 26 include holes of section $e_5$.

This step may be achieved by dry or wet etching, for example DRIE (deep reactive ionic etching).

Figure 10:
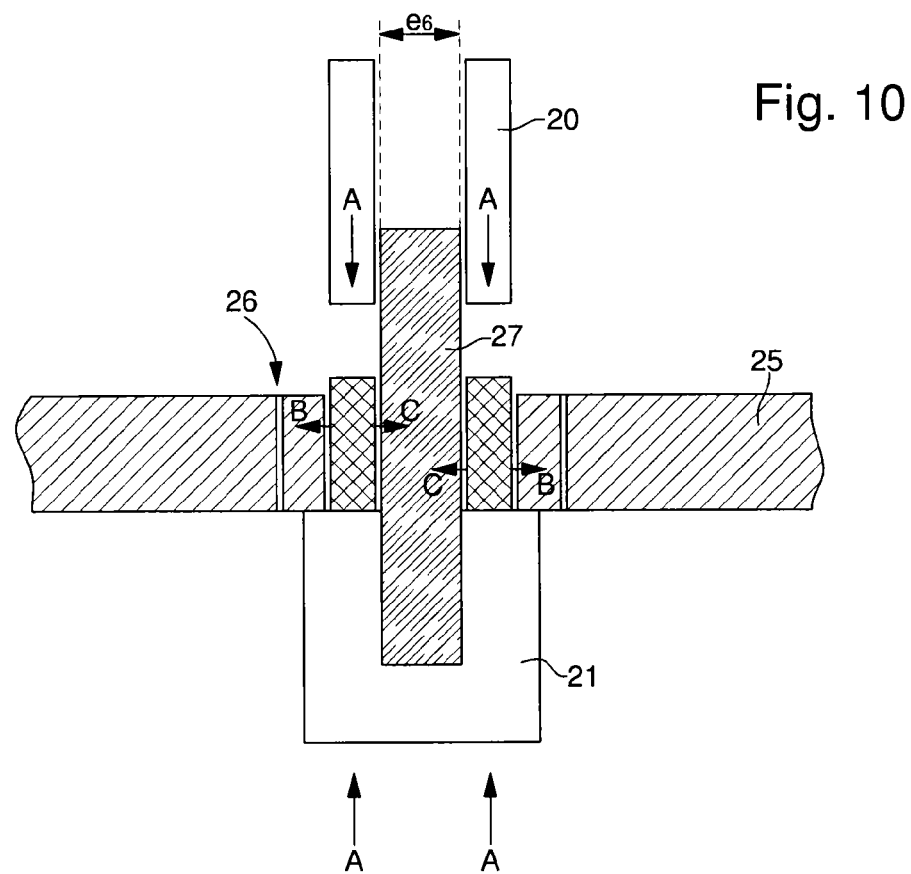
Figure 11:
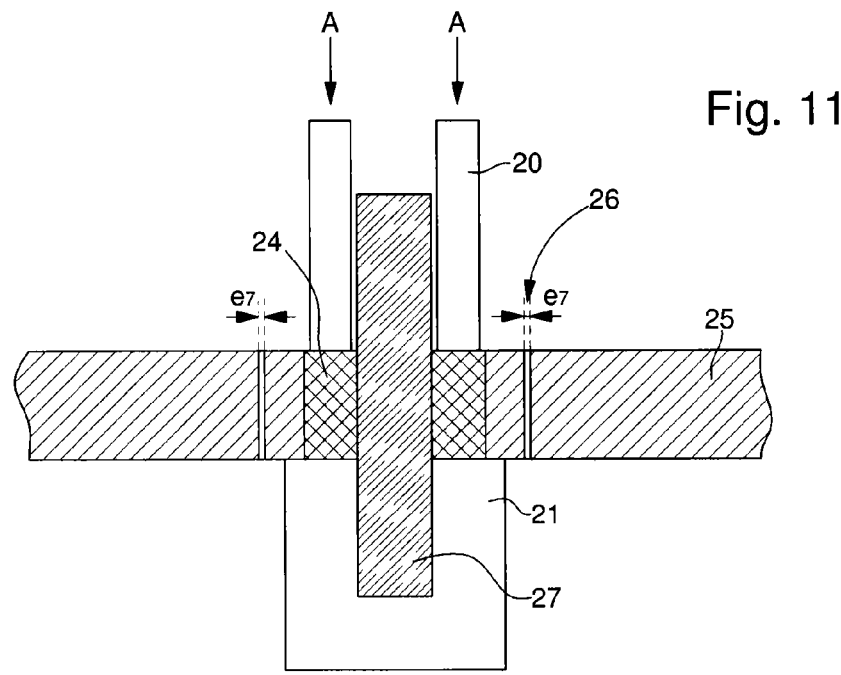

Further, in a second step, the method consists in forming the member, a pivot pin 27 in the example of FIGS. 9 to 11, in a second material with a main section $e_6$. As explained hereinbefore, the second step can be carried out in accordance with usual arbour fabrication processes. Member 27 is preferably metal and may for example be formed of steel.

In a third step, the method consists in forming intermediate part 24 in a third material with a hole 23 of internal section $e_2$ and external section $e_3$, the wall of which substantially matches the shape of the aperture 28. The third step can thus be achieved by conventional machining or an electroforming process. Intermediate part 24 may thus have a thickness of between 100 and 300 μm and a width l, i.e. the external section $e_3$, minus the internal section $e_2$, divided by two ($l=(e_3-e_2)/2$), also comprised between 100 and 300 μm.

Preferably, the third material is more ductile than the second material of member 27 so that the latter is less deformed or not deformed at all during the deformation step. Intermediate part 24 is preferably metal and may thus include nickel and/or gold. However, any other ductile material may advantageously be added to the third material or replace the latter.

Of course, the first three steps do not have to observe any particular order and may even be performed at the same time.

In a fourth step, intermediate part 24 is inserted into aperture 28 without any contact. This means, as seen in FIG. 9, that the section $e_4$ of aperture 28 is larger than or equal to the external section $e_3$ of intermediate part 24.

Preferably, the difference between section $e_4$ of aperture 28 and external section $e_3$ of intermediate part 24 is approximately 10 μm, i.e. a gap of around 5 μm, which separates body 25 from part 3 relative to intermediate part 24.

Further, preferably, according to the invention, intermediate part 24 is held in aperture 28 using one 21 of tools 20, 21 used for the deformation step. Finally, in a preferred manner, tool 21 includes a recess 29 for receiving member 27.

In a fifth step, member 27 is introduced into hole 23 of intermediate part 24 without any contact. This means, as seen in FIG. 10, that the section $e_2$ of hole 23 is larger than or equal to the external section $e_6$ of member 27.

Preferably, the difference between section $e_2$ of hole 23 and the external diameter $e_6$ of member 27 is approximately 10 μm, i.e. a gap of around 5 μm, which separates member 27 from intermediate part 24.

Further, according to the invention, member 27 is held in hole 23 by using said recess 29 of tool 21 of substantially equivalent section to section $e_6$ of member 27.

Finally, the method includes a sixth step, which consists in elastically and/or plastically deforming intermediate part 24 by moving tools 20, 21 towards each other in axial direction A, so as to exert a uniform radial stress C, B respectively against member 27 and against the wall of the part surrounding aperture 28, by stressing the elastic deformation means of part 3, i.e. pierced holes 26.

Thus, as seen in FIG. 11, the pressing on the top and bottom parts of intermediate part 24, respectively by tool 20 and 21, in axial direction A, will induce an elastic and plastic deformation of intermediate part 24, which is deformed exclusively radially in directions B and C, i.e. towards body 25 and towards member 27.

Preferably according to the invention, the parameters of the deformation are set so that the clamping or gripping force is greater at the gaps between the non-deformed intermediate part 24 and on the one hand, the wall of body 25 surrounding aperture 28 and, on the other hand, member 27. Preferably, the clamping force generates a displacement that is comprised between 16 and 40 μm.

Consequently, the elastic and plastic deformation of intermediate part 24 is required to induce both the elastic deformation of body 25 around aperture 28, and also the elastic and/or plastic deformation of member 27, so as to secure member 27, intermediate part 24 and body 25 of wheel 3 to each other, as seen in FIG. 11. This elastic deformation automatically centres the assembly comprising member 27—intermediate part 24—body 25. In this regard, FIG. 11 shows that the pierced holes 26 have a section referenced $e_7$ and no longer $e_5$.

Advantageously according to the invention, it is possible to secure member 27 from any side of body 25 of wheel 3. Further, no axial force (which by definition is likely to be destructive) is applied to body 25 of wheel 3 during the process. Only radial elastic deformation is applied to body 25. It is also to be noted that the use of intermediate part 24, the external wall of which has substantially the same shape as aperture 28, allows a uniform stress to be exerted on a maximised surface area of body 25 around aperture 28, during the radial deformation B of intermediate part 24, in order to prevent breaking the fragile material of wheel 3 and to adapt to any dispersions in fabrication of the various components.

Of course, this invention is not limited to the illustrated example but is capable of various variants and alterations that will appear to those skilled in the art. In particular, the pierced holes of the part made of fragile material may include more or fewer series of holes than the embodiments presented hereinbefore. Moreover, the embodiments presented here may be combined with each other depending upon the intended application.

Figure 12:
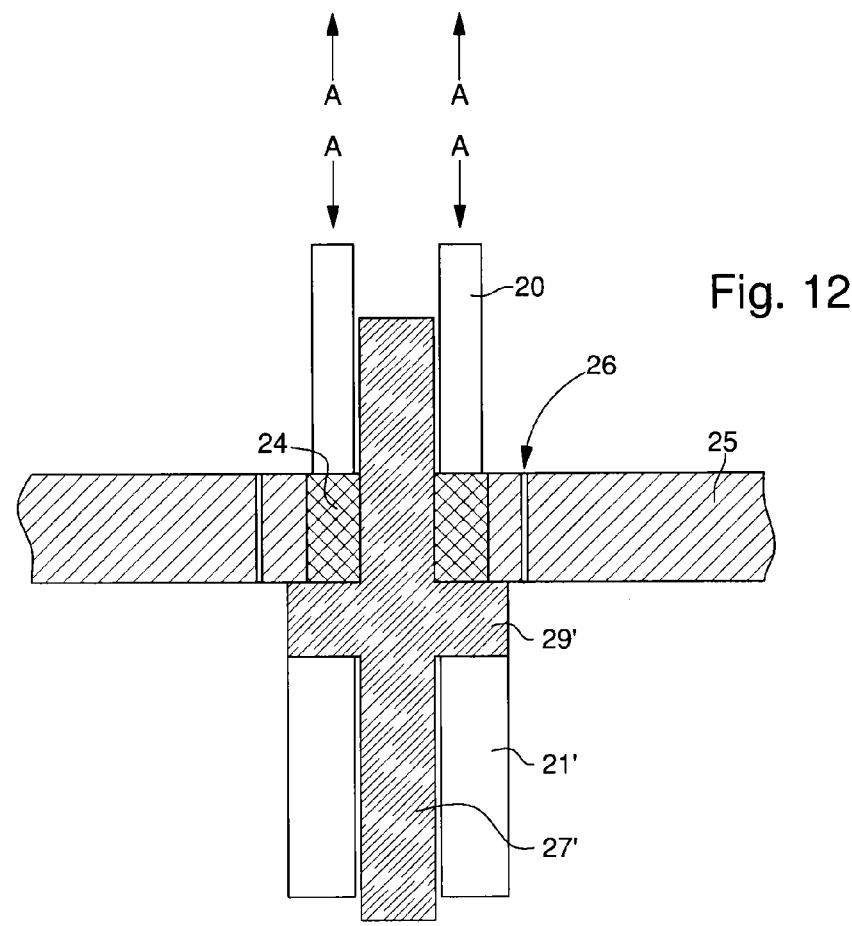
FIG. 12 is a schematic diagram of an alternative step to FIG. 11 of the assembly method according to the invention.

By way of example, FIG. 12 shows an alternative embodiment of the method explained below. Thus, FIG. 12 shows an alternative wherein member 27' is substantially different from member 27, in that it has a collar 29'. Therefore, the bottom portion of tool 21' no longer needs to have a recess 29 but simply has a through hole, the section of which is at least equal to or greater than that of member 27'. It is thus clear that the intermediate part 24 and, possibly, body 25 could then be carried by collar 29' and no longer by one of the tools. Further, the deformation of intermediate part 24 on the bottom portion thereof is no longer achieved directly by tool 21', but via collar 29', with no loss of advantage to the process.

FIGS. 1 and 2 show applications for an escape system, such as pallets 1 and escape wheel 3, or a balance spring 61 of a timepiece movement. Of course, the present assembly 2, 12, 22, 62 may be applied to other elements. It is possible to envisage forming a balance, a bridge or, more generally, a mobile part using an assembly 2, 12, 22, 62 as explained above, but this is not an exhaustive list.

It is also possible to modify intermediate part 24 during the deformation step, so as to facilitate the radial orientation B, C of the stress induced by the deformation of the intermediate part. By way of example, it is therefore possible to envisage making a conical recess coaxial to hole 23, so as to facilitate the radial orientation B, C, but also to make the induced stress progressive.

It is also possible to use assembly 2, 12, 22, 62 in place of elastic means 48 or the cylinders 63, 66 of WO Patent No. 2009/115463 (which is incorporated herein by reference) so as to fix a single-piece sprung balance resonator to a pivot pin.

Of course, two parts like those described hereinbefore may also be secured to the same arbour using two distinct assemblies 2, 12, 22, 62 so as to make their respective movements integral.

Finally, assembly 2, 12, 22, 62 according to the invention can also unite any type of timepiece or other member, whose body is formed of a material having no plastic domain (silicon, quartz, etc.) with an arbour, such as, for example, a tuning fork resonator or more generally a MEMS (Microelectromechanical system).

The invention claimed is:

1. A method of assembling a member made of a first material in a part made of a second material, the second material being a ceramic or a silicon-based material, the method comprising:
   a) forming the part with a solid central region including an aperture and then piercing holes in the solid central region in a circular pattern around the aperture to form elastic deformation means;
   b) inserting an intermediate part, made of a third material and including a hole, into the aperture without any stress;
   c) introducing the member into the hole of the intermediate part without any stress,
   d) elastically and plastically deforming the intermediate part by moving two tools towards each other axially above and below the intermediate part so as to exert a radial stress against the member and against a wall of the part surrounding the aperture by stressing the elastic deformation means of the part and to secure the assembly in a manner that is not destructive for the part.

2. The method according to claim 1, wherein a shape of an external wall of the intermediate part substantially matches the aperture of the part, so as to exert a substantially uniform radial stress on the wall of the part surrounding the aperture.

3. The method according to claim 1, wherein the aperture of the part is circular.

4. The method according to claim 1, wherein the aperture of the part is asymmetrical to prevent any relative movement between the elements of the assembly.

5. The assembly method according to claim 1, wherein, in b), a distance between the wall of the part surrounding the aperture and an external section of the intermediate part is substantially 10 μm.

6. The assembly method according to claim 1, wherein, in c), a distance between the member and an internal section of the intermediate part is substantially 10 μm.

7. The assembly method according to claim 1, wherein, in d), the deformation exerts a clamping force that generates a displacement of the intermediate part of between 16 and 40 μm.

8. The assembly method according to claim 1, wherein, in b) to d), the intermediate part is held in the aperture via one of the two tools.

9. The assembly method according to claim 1, wherein the second material is silicon-based.

10. The assembly method according to claim 1, wherein the third material is formed from a metal or metal alloy base.

11. The assembly method according to claim 1, wherein the part is a timepiece wheel set.

12. The assembly method according to claim 1, wherein the part is timepiece pallets.

13. The assembly method according to claim 1, wherein the part is a timepiece balance spring.

14. The assembly method according to claim 1, wherein the part is a resonator.

15. The assembly method according to claim 1, wherein the part is a MEMS.

16. The assembly method according to claim 1, wherein, in a), the forming the part includes forming spoked arms extending outward from the solid central region to an outer circumference, and the holes are pierced in the solid central region between the aperture and the spoked arms.

17. The assembly method according to claim 1, wherein, in a), the forming the part includes forming a spring spiraling outward from the solid central region, and the holes are pierced in the solid central region between the aperture and the spring.

18. The assembly method according to claim 1, wherein, in a), the piercing the holes includes piercing a first series of the holes in the solid central region in a circular pattern around the aperture and then piercing a second series of the holes in the solid central region in a circular pattern around the aperture, the second series being further outside of the aperture than the first series.

19. A method of assembling a member made of a first material in a part made of a second material, the second material being a ceramic or a silicon-based material, the method comprising:
   a) forming the part with an aperture and pierced holes distributed around the aperture intended to form elastic deformation means;
   b) inserting an intermediate part, made of a third material and including a hole, into the aperture without any stress;
   c) introducing the member into the hole without any stress;
   d) elastically and plastically deforming the intermediate part by moving two tools towards each other axially above and below the intermediate part so as to exert a radial stress against the member and against the wall of the part surrounding the aperture by stressing the elastic deformation means of the part and to secure the assembly in a manner that is not destructive for the part,
   wherein, in c), a distance between the member and an internal section of the intermediate part is substantially 10 μm.

20. A method of assembling a member made of a first material in a part made of a second material, the second material being a ceramic or a silicon-based material, the method comprising:
   a) forming the part with an aperture and pierced holes distributed around the aperture intended to form elastic deformation means;
   b) inserting an intermediate part, made of a third material and including a hole, into the aperture without any stress;

c) introducing the member into the hole without any stress;
d) elastically and plastically deforming the intermediate part by moving two tools towards each other axially above and below the intermediate part so as to exert a radial stress against the member and against the wall of the part surrounding the aperture by stressing the elastic deformation means of the part and to secure the assembly in a manner that is not destructive for the part, wherein, in b) to d), the intermediate part is held in the aperture via one of the two tools.

* * * * *